US010110958B2

(12) United States Patent
Shovkoplias (10) Patent No.: US 10,110,958 B2
(45) Date of Patent: Oct. 23, 2018

(54) VIDEO SERVICES RECEIVER THAT PROVIDES A NOTIFICATION OF UPCOMING PROGRAM EVENTS HAVING CONTENT THAT IS PREFERRED BY THE USER, AND RELATED OPERATING METHODS

(75) Inventor: Iurii Shovkoplias, Kharkiv (UA)

(73) Assignee: ECHOSTAR UKRAINE LLC, Kharkiv (UA)

( * ) Notice: Subject to any disclaimer, the term of this patent is extended or adjusted under 35 U.S.C. 154(b) by 204 days.

(21) Appl. No.: 14/357,154

(22) PCT Filed: Nov. 11, 2011

(86) PCT No.: PCT/UA2011/000114
§ 371 (c)(1),
(2), (4) Date: Sep. 4, 2014

(87) PCT Pub. No.: WO2013/070177
PCT Pub. Date: May 16, 2013

(65) Prior Publication Data
US 2015/0150045 A1   May 28, 2015

(51) Int. Cl.
| H04N 21/466 | (2011.01) |
| H04N 21/442 | (2011.01) |
| H04N 21/45  | (2011.01) |
| H04N 21/472 | (2011.01) |
| H04N 21/475 | (2011.01) |
| H04N 21/488 | (2011.01) |

(52) U.S. Cl.
CPC ... *H04N 21/4668* (2013.01); *H04N 21/44222* (2013.01); *H04N 21/4532* (2013.01); *H04N 21/4755* (2013.01); *H04N 21/47214* (2013.01); *H04N 21/4882* (2013.01)

(58) Field of Classification Search
CPC ......... H04N 21/4668; H04N 21/44222; H04N 21/4532; H04N 21/47214; H04N 21/4755; H04N 21/4882
USPC ........................................ 725/13, 34, 46, 36
See application file for complete search history.

(56) References Cited

U.S. PATENT DOCUMENTS

| 6,075,526 A  | 6/2000  | Rothmuller |
| 6,133,909 A  | 10/2000 | Schein et al. |
| 6,865,746 B1 | 3/2005  | Herrington et al. |
| 8,151,293 B1 * | 4/2012 | Kolde ................ H04N 21/4263 725/32 |

(Continued)

OTHER PUBLICATIONS

European Patent Office, International Search Report and Written Opinion, dated Apr. 12, 2012 for International Application No. PCT/UA2011/000114.

*Primary Examiner* — Nathan J Flynn
*Assistant Examiner* — Caroline Somera
(74) *Attorney, Agent, or Firm* — Lorenz & Kopf LLP (57) ABSTRACT

A video services receiver for presenting video content, and related methods of operating the video services receiver, are presented here. An exemplary operating method identifies, at the video services receiver, an upcoming program event having content preferred by a user of the video services receiver. The method continues by generating, at the video services receiver, a graphical program notification comprising information related to the upcoming program event. The graphical program notification is provided for presentation on a display associated with the video services receiver.

2 Claims, 8 Drawing Sheets

(56) References Cited

U.S. PATENT DOCUMENTS

| | | | |
|---|---|---|---|
| 2002/0010922 A1* | 1/2002 | Darin | H04N 5/44543 725/32 |
| 2003/0131356 A1* | 7/2003 | Proehl | H04N 5/44543 725/58 |
| 2003/0182658 A1* | 9/2003 | Alexander | G06Q 30/0633 725/60 |
| 2004/0205698 A1* | 10/2004 | Schliesmann | H04N 5/44513 717/106 |
| 2004/0221308 A1* | 11/2004 | Cuttner | H04N 5/44543 725/46 |
| 2005/0086692 A1* | 4/2005 | Dudkiewicz | H04N 5/44543 725/46 |
| 2005/0204388 A1 | 9/2005 | Knudson et al. | |
| 2007/0169148 A1* | 7/2007 | Oddo | H04N 5/44543 725/46 |
| 2008/0026694 A1* | 1/2008 | Ramanathan | H04N 5/44508 455/39 |
| 2008/0184308 A1* | 7/2008 | Herrington | H04N 5/44543 725/43 |
| 2010/0107194 A1* | 4/2010 | McKissick | H04N 5/44513 725/40 |
| 2010/0287588 A1* | 11/2010 | Cox | H04N 5/44543 725/40 |
| 2012/0117471 A1* | 5/2012 | Amidon | H04N 5/76 715/716 |

\* cited by examiner

VIDEO SERVICES RECEIVER THAT PROVIDES A NOTIFICATION OF UPCOMING PROGRAM EVENTS HAVING CONTENT THAT IS PREFERRED BY THE USER, AND RELATED OPERATING METHODS

TECHNICAL FIELD

Embodiments of the subject matter described herein relate generally to video services receivers. More particularly, embodiments of the subject matter relate to the generation, presentation, and control of an interactive notification element that provides a list of upcoming program events having content that is preferred by the user.

BACKGROUND

Most television viewers now receive their video signals through a content aggregator such as a cable or satellite television provider. Digital video broadcasting (DVB) systems, such as satellite systems, are generally known. A DVB system that delivers video service to a home will usually include a video services receiver, system, or device, which is commonly known as a set-top box (STB). In the typical instance, encoded television signals are sent via a cable or wireless data link to the viewer's home, where the signals are ultimately decoded in the STB. The decoded signals can then be viewed on a television or other appropriate display as desired by the viewer.

A given user of an STB will typically have certain preferences or viewing habits that relate to preferred programming genres (e.g., comedies, documentaries, cartoons), topics (e.g., cars, skateboarding, food), program titles (e.g., "The Simpsons" or "Mad Men"), etc. In this regard, the user naturally tends to view programming that matches his or her personal preferences, while avoiding programming that appears to be unrelated to those preferences. Selecting certain content-focused channels is one traditional way for a user to view preferred program events. For example, a sports fan may choose to watch a sports-centric channel such as ESPN, other users may instead choose to watch a food-centric channel such as The Food Network, and other users may prefer to watch an educational channel such as The Discovery Channel or PBS.

Modern DVB systems can support hundreds of different channels that deliver different types of content. In practice, it can be difficult if not impossible for users to monitor and search for desired programming content that might be available on the different channels. Accordingly, it is desirable to have a methodology for identifying and presenting a list of preferred content to a user of a video services receiver as a notification of upcoming program events. Furthermore, other desirable features and characteristics will become apparent from the subsequent detailed description and the appended claims, taken in conjunction with the accompanying drawings and the foregoing technical field and background.

BRIEF SUMMARY

An exemplary embodiment of a method of operating a video services receiver begins by identifying, at the video services receiver, an upcoming program event having content preferred by a user of the video services receiver. The method continues by generating, at the video services receiver, a graphical program notification comprising information related to the upcoming program event. The method provides the graphical program notification for presentation on a display associated with the video services receiver.

Another embodiment of a method of operating a video services receiver begins by obtaining, at the video services receiver, user-specified content preferences for a user. The method continues by analyzing available program listings to identify upcoming program events having program-designating information corresponding to the user-specified content preferences, presenting a first video program event on a display associated with the video services receiver, and, during presentation of the first video program event, presenting an interactive program notification on the display. The interactive program notification includes information related to an upcoming program event that satisfies the user-specified content preferences.

An exemplary embodiment of a video services receiver for presenting video content includes a receiver interface to receive data associated with video services, a display interface for a display operatively coupled to the video services receiver, a content identification module, and a processor coupled to the receiver interface, the content identification module, and the display interface. The display interface facilitates presentation of program events on the display. The content identification module is coupled to the receiver interface to analyze programming data associated with program events and the video services. The processor generates an interactive program notification when the content identification module identifies an upcoming program event having content preferred by a user of the video services receiver. The interactive program notification comprises information related to the upcoming program event, and the display interface presents the interactive program notification window for rendering on the display.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The exemplary embodiments described below relate to a video delivery system such as a satellite television system. The disclosed subject matter relates to the generation and rendering of an interactive program notification element (e.g., a popup window) that includes a list of program events that might be of interest to the user. More specifically, the disclosed subject matter relates to an intelligent methodology that searches real-time programming data and/or metadata, such as electronic program guide (EPG) data, to find upcoming program events that match certain user-specified criteria and/or that match certain program-designating or content-defining information that is associated with a program event or channel that is currently being viewed by the user.

Figure 1:
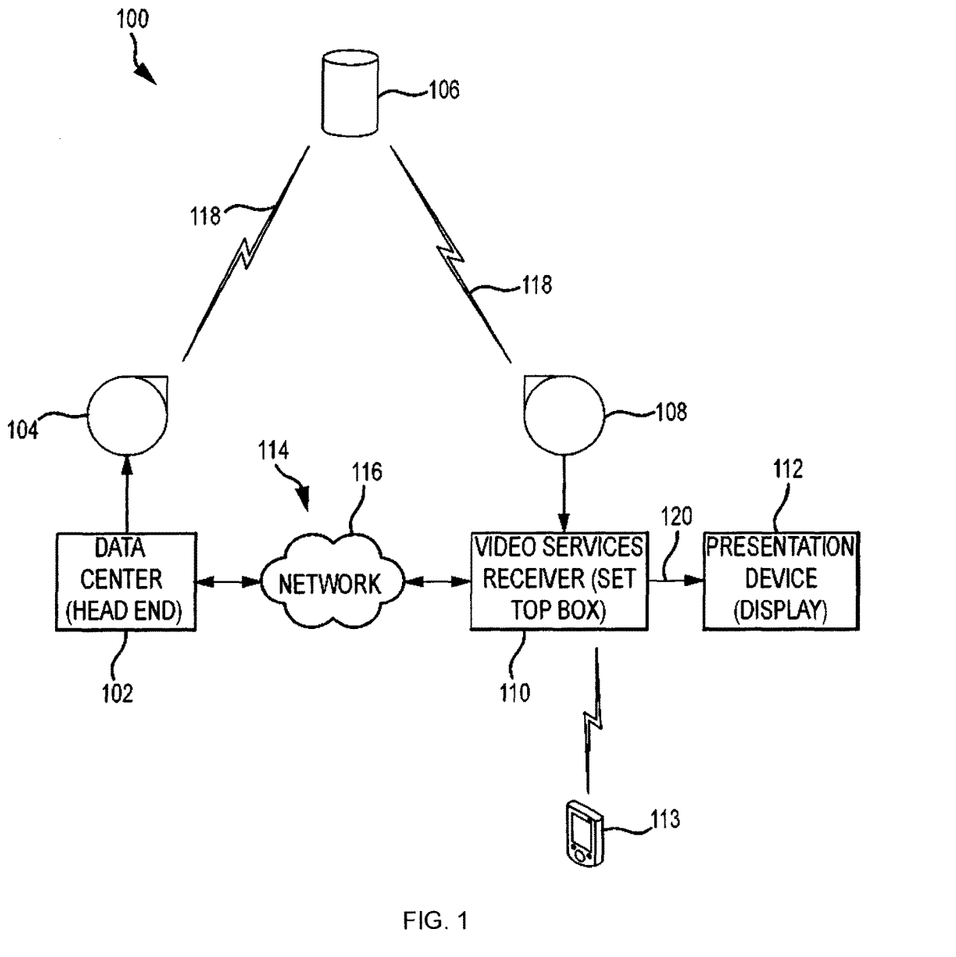
FIG. 1 is a schematic representation of an embodiment of a video services broadcasting system.

Turning now to the drawings, FIG. 1 is a schematic representation of an embodiment of a video services broadcasting system 100 that is suitably configured to support the techniques and methodologies described in more detail below. The system 100 (which has been simplified for purposes of illustration) generally includes, without limitation: a data center 102; an uplink transmit antenna 104; a satellite 106; a downlink receive antenna 108; a video services receiver 110 or other customer equipment; and a presentation device, such as a display device 112. In typical deployments, the video services receiver 110 can be remotely controlled using a wireless remote control device 113. In certain embodiments, the data center 102 communicates with the video services receiver 110 via a back-channel connection 114, which may be established through one or more data communication networks 116. For the sake of brevity, conventional techniques related to satellite communication systems, satellite broadcasting systems, DVB systems, data transmission, signaling, network control, and other functional aspects of the systems (and the individual operating components of the systems) may not be described in detail herein.

The data center 102 may be deployed as a headend facility and/or a satellite uplink facility for the system 100. The data center 102 generally functions to control content, signaling data, programming information, and other data sent over a high-bandwidth link 118 to any number of downlink receive components (only one downlink receive antenna 108, corresponding to one customer, is shown in FIG. 1). In practice, the data center 102 also provides content and data that can be used to populate an interactive electronic program guide (EPG) generated by the video services receiver 110 and/or to populate an interactive program notification element generated by the video services receiver 110. In the embodiment shown in FIG. 1, the high-bandwidth link 118 is a direct broadcast satellite (DBS) link that is relayed by the satellite 106, although equivalent embodiments could implement the high-bandwidth link 118 as any sort of cable, terrestrial wireless and/or other communication link as desired.

The data center 102 includes one or more conventional data processing systems or architectures that are capable of producing signals that are transmitted via the high-bandwidth link 118. In various embodiments, the data center 102 represents a satellite or other content distribution center having: a data control system for controlling content, signaling information, blackout information, programming information, and other data; and an uplink control system for transmitting content, signaling information, blackout information, programming information, and other data using the high-bandwidth link 118. These systems may be geographically, physically and/or logically arranged in any manner, with data control and uplink control being combined or separated as desired.

The uplink control system used by system 100 is any sort of data processing and/or control system that is able to direct the transmission of data on the high-bandwidth link 118 in any manner. In the exemplary embodiment illustrated in FIG. 1, the uplink transmit antenna 104 is able to transmit data to the satellite 106, which in turn uses an appropriate transponder for repeated transmission to the downlink receive antenna 108.

Under normal operating conditions, the satellite 106 transmits content, signaling data, blackout information, EPG data, and other data to the downlink receive antenna 108, using the high-bandwidth link 118. In practical embodiments, the downlink receive antenna 108 represents the customer's satellite dish, which is coupled to the video services receiver 110. The video services receiver 110 can be realized as any device, system or logic capable of receiving signals via the high-bandwidth link 118 and the downlink receive antenna 108, and capable of providing demodulated content to a customer via the display device 112.

The display device 112 may be, without limitation: a television set; a monitor; a computer display; or any suitable customer appliance with compatible display capabilities. In various embodiments, the video services receiver 110 is a conventional set-top box commonly used with DBS or cable television distribution systems. In other embodiments, however, the functionality of the video services receiver 110 may be commonly housed within the display device 112 itself. In still other embodiments, the video services receiver 110 is a portable device that may be transportable with or without the display device 112. The video services receiver 110 may also be suitably configured to support broadcast television reception, video game playing, personal video recording and/or other features as desired.

During typical operation, the video services receiver 110 receives programming (broadcast events), signaling information, and/or other data via the high-bandwidth link 118. The video services receiver 110 then demodulates, decompresses, descrambles, and/or otherwise processes the received digital data, and then converts the received data to suitably formatted video signals 120 that can be rendered for viewing by the customer on the display device 112. For the implementation described here, the video services receiver 110 includes or cooperates with a recording module (e.g., a DVR module) that records received programming for time-shifted playback. The recorded program events may include any combination of audio programs, video programs, audio-visual programs, or the like. Additional features and functions of the video services receiver 110 are described below with reference to FIG. 2.

The system 100 includes one or more speakers, transducers, or other sound generating elements or devices that are utilized for playback of sounds during operation of the system 100. These sounds may be, without limitation: the audio portion of a video channel or program; the content associated with an audio-only channel or program; audio related to the navigation of the graphical programming guide; confirmation tones generated during operation of the system; alerts or alarm tones; or the like. Depending upon the embodiment, the system 100 may include a speaker (or a plurality of speakers) attached to, incorporated into, or otherwise associated with the display device, the video services receiver 110, the remote control device 113, and/or a home theater, stereo, or other entertainment system provided separately from the system 100.

Figure 2:
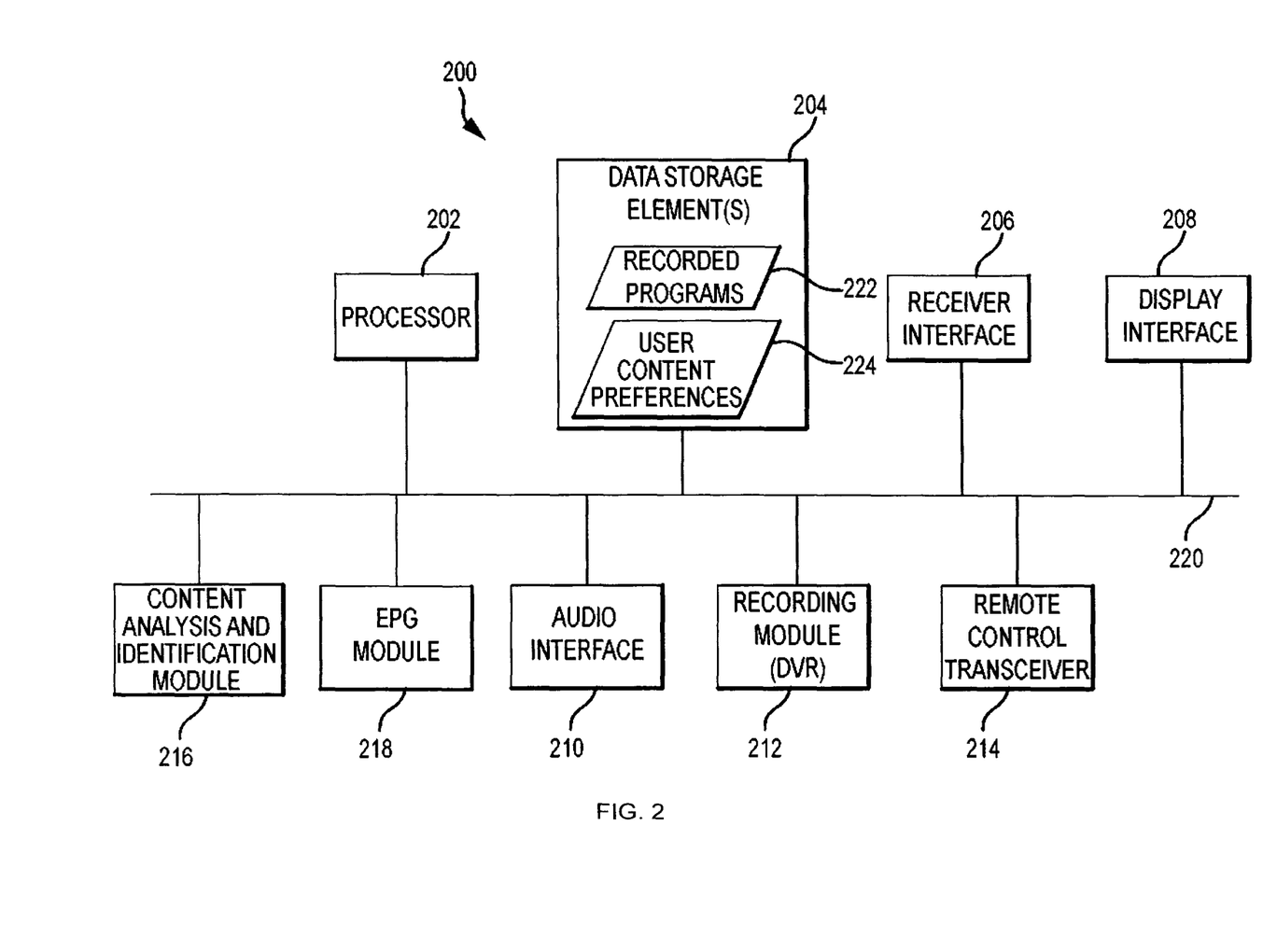
FIG. 2 is a schematic representation of an embodiment of a video services receiver suitable for use in the video services broadcasting system shown in FIG. 1.

FIG. 2 is a schematic representation of an embodiment of a video services receiver 200 suitable for use in the video services broadcasting system 100 shown in FIG. 1. The video services receiver 200 is designed and configured for providing recorded and non-recorded content to a user, by way of one or more presentation devices. Accordingly, the video services receiver 200 can be used to receive program content, record program content, and present recorded and non-recorded program content to an appropriate display for viewing by a customer or user. The video services receiver 200 also supports the program notification features presented here, wherein an interactive notification window or graphical user interface (GUI) element is generated and displayed to inform the user of upcoming program events that might be of interest. This notification feature is described in more detail below.

This illustrated embodiment of the video services receiver 200 generally includes, without limitation: at least one processor 202; at least one data storage element 204 having a suitable amount of memory associated therewith; a receiver interface 206; a display interface 208 for the display; an audio interface 210; a recording module 212; and a remote control transceiver 214. The video services receiver 200 also includes one or more modules or elements that support the program notification techniques described here. In this regard, an embodiment of the video services receiver 200 may include a content analysis and identification module 216 and an EPG module 218. The illustrated components, modules, and elements may be coupled together as needed for purposes of interaction and communication using, for example, an appropriate interconnect arrangement or architecture 220. It should be appreciated that the video services receiver 200 represents a "full featured" embodiment that supports various features described herein. In practice, an implementation of the video services receiver 200 need not support all of the features described here and, therefore, one or more of the elements depicted in FIG. 2 may be omitted from a practical embodiment. Moreover, a practical implementation of the video services receiver 200 will include additional elements and features that support conventional functions and operations.

The processor 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as a microprocessor, a controller, a microcontroller, or a state machine. Moreover, the processor 202 may be implemented as a combination of computing devices, e.g., a combination of a digital signal processor and a microprocessor, a plurality of microprocessors, one or more microprocessors in conjunction with a digital signal processor core, or any other such configuration.

The data storage elements 204 may be realized using any number of devices, components, or modules, as appropriate to the embodiment. Moreover, the video services receiver 200 could include data storage elements 204 integrated therein and/or data storage elements 204 operatively coupled thereto, as appropriate to the particular embodiment. In practice, a data storage element 204 could be realized as RAM memory, flash memory, EPROM memory, EEPROM memory, registers, a hard disk, a removable disk, or any other form of storage medium known in the art. In certain embodiments, the data storage elements 204 include a hard disk, which may also be used to support integrated DVR functions of the video services receiver 200. The data storage elements 204 can be coupled to the processor 202 such that the processor 202 can read information from, and write information to, the data storage elements 204. In the alternative, the data storage elements 204 may be integral to the processor 202. As an example, the processor 202 and a data storage element 204 may reside in a suitably designed ASIC.

As depicted in FIG. 2, the data storage elements 204 can be used to store recorded programs 222 for the recording module 212. In practice, the recorded programs 222 can be formatted, handled, and stored in accordance with well known and conventional DVR techniques and methodologies. The data storage elements 204 can also be used to maintain a suitably formatted database 224 (or any appropriate data structure) that contains entries associated with content preferences, content matching criteria, and/or other configuration data for one or more users of the video services receiver 200. In certain implementations, the data maintained in the database 224 represents user-specified or user-entered data, which can be obtained via an appropriate GUI generated by the video services receiver 200.

In certain embodiments, the video services receiver 200 maintains user-specified content preferences or criteria for each user, such that the program notification feature can be customized to the different preferences, likes, and dislikes of a plurality of users if needed. Accordingly, the database 224 could contain any number of different entries, subject to practical limitations related to storage capacity, the particular database management application, etc. An entry in the database 224 includes information, settings, and/or criteria that is related to video services or content of interest to the particular user. For example, an entry may include some or all of the following information, without limitation: a title of at least one program event; a series name of at least one program event (e.g., "The Simpsons" or "Wheel Of Fortune"); at least one parental guidance rating for program events; at least one content category, classification, or genre for program events; a content description for at least one program event; at least one content keyword for program events; the name of one or more favorite actors, directors, producers; or the like. As described in more detail below, some or all of this information can be used to search for upcoming program events that may be of interest to the user.

The receiver interface 206 is coupled to the customer's satellite antenna, and the receiver interface 206 is suitably configured to receive and perform front end processing on signals transmitted by satellite transponders. In this regard, the receiver interface 206 can receive data associated with any number of services (e.g., video services), including EPG data that is used by the EPG module 218, and control or signaling data. The receiver interface 206 may leverage conventional design concepts that need not be described in detail here.

The display interface 208 is operatively coupled to one or more display elements (not shown) at the customer site. The display interface 208 represents the hardware, software, firmware, and processing logic that is utilized to render graphics, images, video, and other visual indicia on the customer's display. In this regard, the display interface 208 facilitates the presentation of programs on the display(s) at the customer premises. Moreover, the display interface 208 is capable of providing graphical interactive program notification elements for video services, interactive listings of recorded programs, interactive graphical menus, and other GUIs for display to the user. The display interface 208 may leverage conventional design concepts that need not be described in detail here.

The audio interface 210 is coupled to one or more audio system components (not shown) at the customer site. The audio interface 210 represents the hardware, software, firmware, and processing logic that is utilized to generate and provide audio signals associated with the operation of the video services receiver 200. Depending upon the particular embodiment, the audio interface 210 may be tangibly or wirelessly connected to the audio portion of a television or monitor device, or it may be tangibly or wirelessly connected to a sound system component that cooperates with the television or monitor device.

The recording module 212 is operatively coupled to the receiver interface 206 to record program events provided by the incoming services. In practice, the recording module 212 may include, cooperate with, or be realized as hardware, software, and/or firmware that is designed to provide traditional DVR features and functions for the video services receiver 200. Accordingly, the recording module 212 may record video programs provided by video services, audio-only programs provided by audio services, or the like. As mentioned above, the recording module 212 cooperates with the data storage elements 204 to store the recorded programs 222 as needed.

The remote control transceiver 214 performs wireless communication with one or more compatible remote devices, such as a remote control device, a portable computer, an appropriately equipped mobile telephone, or the like. The remote control transceiver 214 enables the user to remotely control various functions of the video services receiver 200, in accordance with well known techniques and technologies. In certain embodiments, the remote control transceiver 214 is also used to wirelessly receive requests and commands that are related to user interaction with a displayed program notification, as will become apparent from the following description. For example, the remote control device 113 (see FIG. 1) could be used to facilitate user navigation and manipulation of one or more GUI control elements rendered with a program notification element.

The content analysis and identification module 216 represents the hardware, software, firmware, and/or processing logic associated with certain content-related operations described here. Although shown as a distinct block in FIG. 2, the content analysis and identification module 216 could be realized as part of the processor 202 and/or as part of another module of the video services receiver 200 (such as the EPG module 218 or the recording module 212). As described in more detail below with reference to FIGS. 3-6, the content analysis and identification module 216 is suitably configured to analyze programming data (EPG data) associated with program events and/or associated with the video services that provide the program events to identify upcoming program events having content that is preferred by, desired by, or of interest to, the user. In accordance with one exemplary scenario, the content analysis and identification module 216 identifies program events having designated content that is consistent with the content of a program event that is currently being presented on the display of the video services receiver 200. In accordance with another exemplary scenario, the content analysis and identification module 216 identifies program events having designated content that is consistent with user-specified content preferences for the user.

The EPG module 218 represents the hardware, software, firmware, and/or processing logic associated with certain content-related, program guide, and program notification operations described here. Although shown as a distinct block in FIG. 2, the EPG module 218 could be realized as part of the processor 202 and/or as part of another module of the video services receiver 200 (such as the content analysis and identification module 216 or the recording module 212). The EPG module 218 is configured to support conventional EPG features and functions related to the generation and population of an interactive graphical program guide. Moreover, the EPG module 218 is configured to support the program notification feature by receiving EPG data and making the received EPG data available to the content analysis and identification module 216.

In practice, the EPG and/or other programming data could be delivered to the video services receiver 200 during the normal scheduled broadcast of program events, or it could be delivered to the video services receiver 200 prior to scheduled broadcasts. For example, EPG data could be sent to the video services receiver 200 using one or more overhead signaling and/or control channels. The manner in which the video services receiver 200 obtains this information is unimportant for purposes of this description, and the specific data transmission methodology may vary from one deployment to another.

Notably, any or all of the EPG programming data may be considered to be program-designating or content-defining information that describes (at least in part) the content of the events received and to be received by the video services receiver 200. In this regard, the information that identifies the content of a program event could be realized using any suitable formator data type. For example, program-designating information may include one or more of the following, without limitation: program event titles; program event series names; parental guidance ratings; content categories, classifications, or genres; descriptive text or content summaries of the program events; content keywords; and names or other identifiers of actors, directors, producers, or the like.

Figure 3:
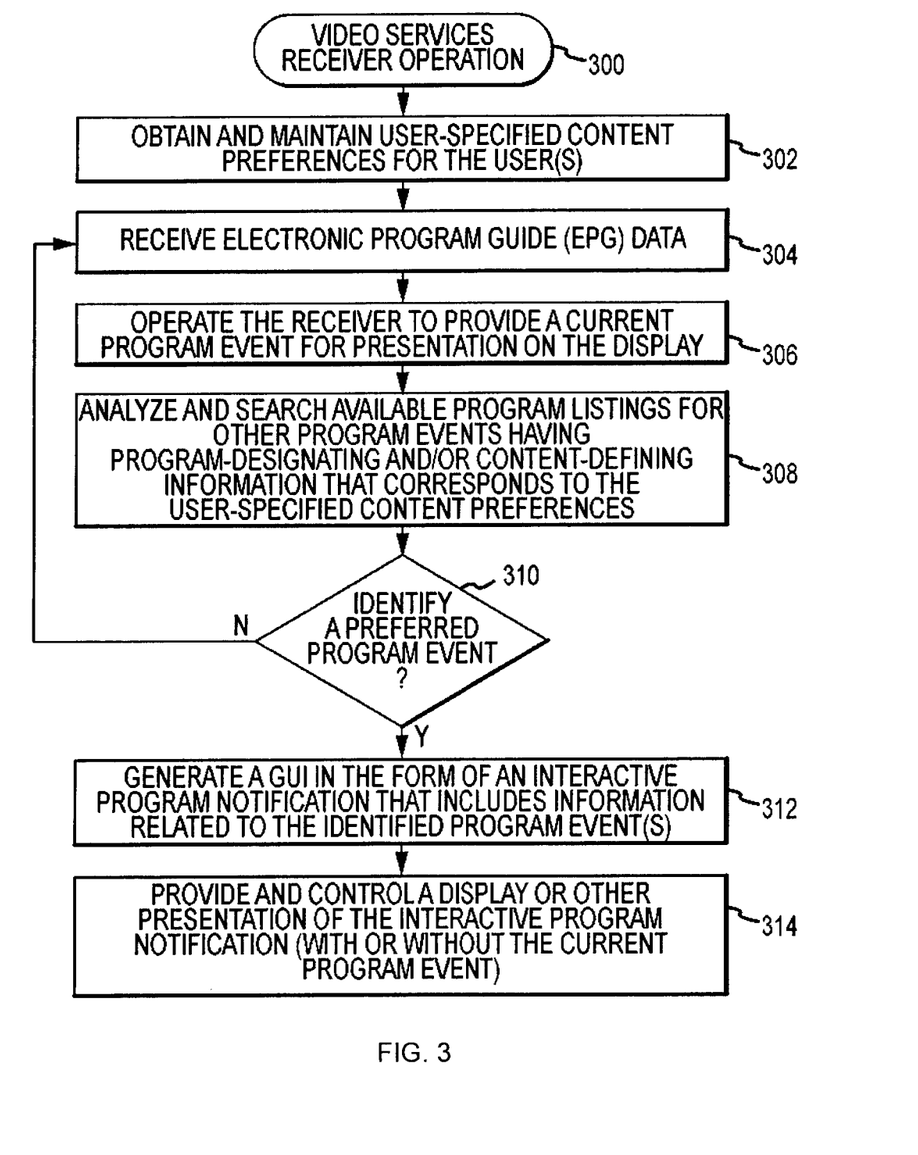
FIG. 3 is a flow chart that illustrates an exemplary embodiment of a method of operating a video services receiver.

The system 100 (FIG. 1) and the video services receiver 200 (FIG. 2) can be used to identify programming that might be of interest to a user and, if at least one potentially relevant program event is identified, generate and render an interactive GUI in the form of a program notification window, sidebar, scrolling tape, popup, or the like, where the program notification includes a listing for the identified program event(s). In this regard, FIG. 3 is a flow chart that illustrates an exemplary embodiment of a process 300 for operating a video services receiver. It should be appreciated that the various tasks performed in connection with a process described herein may be performed by software, hardware, firmware, or any combination thereof. For illustrative purposes, a described process may refer to elements mentioned above in connection with FIG. 1 and FIG. 2. In practice, portions of a described process may be performed by different elements of the described system, e.g., a DVR module, a processor, a storage element, an EPG module, or the like. It should be appreciated that an illustrated process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from an embodiment of a described process as long as the intended overall functionality remains intact.

The process 300 may be performed by the video services receiver 110 shown in FIG. 1 and/or by the video services receiver 200 shown in FIG. 2. The illustrated embodiment of the process 300 begins by obtaining and maintaining user-specified content preferences for the user(s) of the video services receiver (task 302). The video services receiver can obtain user-specified content preferences for any number of different users. In practice, a user can enter his or her content preferences using a suitably formatted GUI that is generated and presented by the video services receiver. In this regard, task 302 may accommodate the selection of predetermined preference options (e.g., using selectable radio buttons and/or dropdown menus), user-entered text strings, or the like. The video services receiver can be designed to accommodate any number of content preferences per user. A given user can update his or her content preferences and related search criteria at any time, and any updates will be saved for subsequent use as described below.

The process 300 also receives programming data that conveys available and upcoming program listings. In certain embodiments, this programming data is received in the form of EPG data (task 304) that can be stored, handled, and processed by the video services receiver in a conventional manner. The video services receiver is operated to receive a current program event (task 306) and to provide the current program event for presentation to the user. For this example, the program event includes audio and video content, although the program event could alternatively be audio-only content, still image content, video-only content, etc. As explained previously, each program event is preferably identified by corresponding program-designating information that can be processed by the video services receiver as needed.

While the current program event is being presented by the video services receiver, the process 300 continues by analyzing and searching the available program listings for upcoming program events having program-designating information and/or content-defining information (e.g., metadata) that corresponds to, matches, or is otherwise consistent with the user-specified content preferences (task 308). In this regard, the video services receiver uses the user-specified content preferences as search criteria to scan the EPG data for other program events that might be of interest to the user. Any number of search fields, terms, keywords, or data types can be used as the basis for identifying other program events that match the user preferences. As a simple example, the process 300 might search the EPG data for a specific user-entered series title, such as "South Park" to notify the user of upcoming episodes on one or more channels. As another example, the process might search the EPG data for program events that can be identified by "Movie" as the genre and by "John Travolta" as the actor. Notably, this second example demonstrates that a plurality of different search terms or fields can be used if so desired by the user. Thus, depending upon the complexity and specificity of the user preferences, more or less program events will be discovered by the video services receiver.

If the process 300 does not identify any upcoming program event having "user preferred" content (the "No" branch of query task 310), then the process 300 may exit or return to task 304 to proceed as described above. This example assumes that the process 300 identifies at least one upcoming program event that is deemed to be consistent with the user-specified content preferences (the "Yes" branch of query task 310). The discovery of one or more "user preferred" program events that satisfies the user-specified content preferences causes the video services receiver to generate a suitably formatted GUI in the form of an interactive program notification (task 312). The interactive program notification includes an entry for the identified upcoming program event, where the entry conveys information related to the identified program event. In certain exemplary embodiments, the program notification may include a listing that contains multiple entries corresponding to any number of identified program events. The process 300 continues by providing and controlling a display or other presentation of the interactive program notification (task 314). In certain situations, the program notification is presented concurrently with the current program such that the user can continue to enjoy the current program without interruption. In other words, the process 300 controls the display of the program notification without terminating the presentation of the current program content. In other scenarios, the program notification is presented in lieu of the current program event.

Although the preferred implementation described here refers to the notification of "upcoming" program events that are scheduled to be received in the future, the technique and methodology can also be applied in an equivalent manner to provide a notification of other program events that may be currently available on channels (video services) other than the current channel. For example, if the current program event is being provided on Channel 723 and a program event (that is deemed to be of interest to the user) is currently available on Channel 824, then the program notification could be used to notify the user of the availability of the ongoing program event on Channel 824. The subject matter presented here is intended to address both currently available content and content that will be available at some time in the future.

The timing of the generation and display of the program notification can be managed and controlled in any desired manner. For example, the video services receiver may be configured such that the program notification appears at a predetermined time before the scheduled start time of an upcoming program event (e.g., thirty minutes before the start time). In certain embodiments, the amount of lead time associated with the display of the program notification is user configurable. Moreover, the program notification may be displayed in a persistent manner until the user actively closes it or otherwise manipulates the display. Alternatively, the video services receiver may automatically close the program notification after a designated amount of time has passed (e.g., fifteen seconds) unless user interaction with the program notification element is detected. As yet another option, the program notification may be displayed any number of times prior to the beginning of the upcoming program event, as a redundant reminder to the user. These and other configurable settings may be desirable to allow the user to balance the benefit of the program notification with the temporary distraction associated with the presentation of the current program event.

During the process 300, a graphical representation of the program notification can be displayed. In this regard, and referring to FIG. 4, an exemplary embodiment of an interactive program notification element 400 is depicted. This graphical representation is merely one possible layout that could be used for the program notification element 400. It should be appreciated that the particular shape, size, layout, and amount of information included in an embodiment of a program notification can vary from one system to another, from one receiver to another, and/or in accordance with the specific program events under consideration and the number of different program events that are identified as being potentially of interest to the user.

Figure 4:
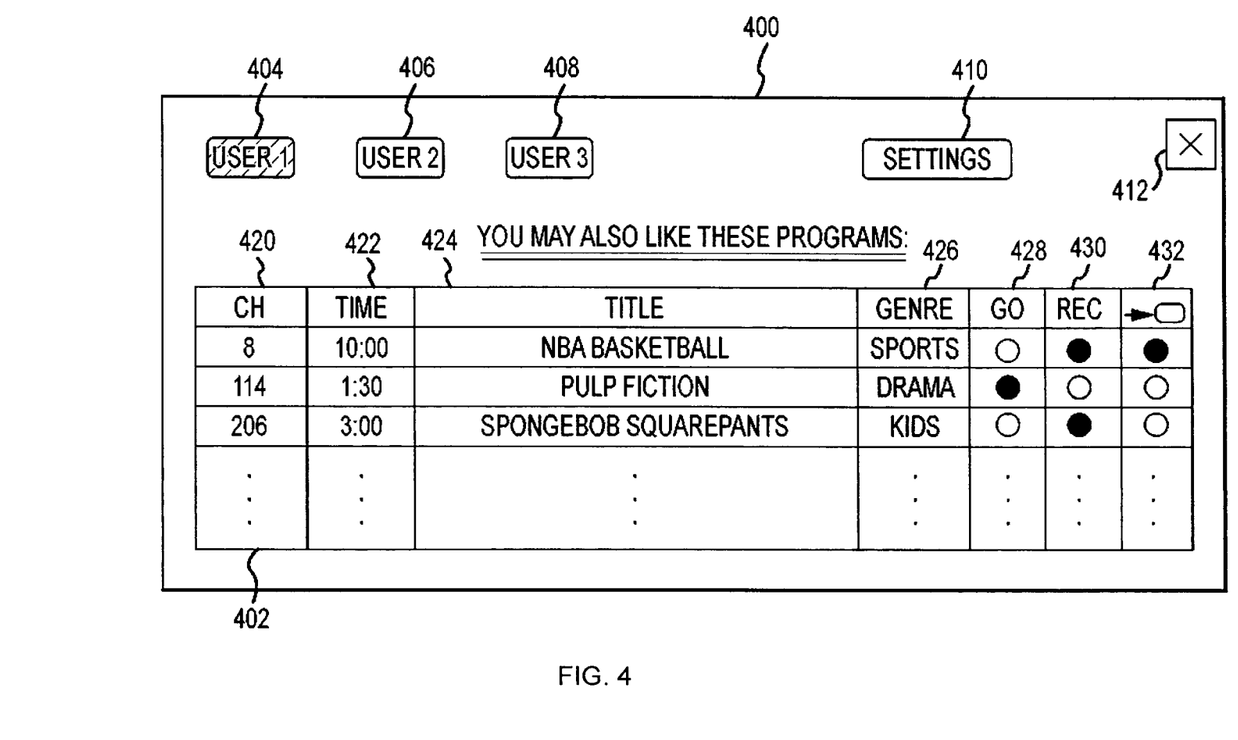
FIG. 4 is an illustration of an exemplary embodiment of an interactive program notification element.

The illustrated embodiment of the program notification element 400 includes a program listing 402; user selection buttons 404, 406, 408; a settings button 410; and a close button 412. The user selection buttons 404, 406, 408 are used to select the current user, such that the program listing 402 will be populated in accordance with the selected user's content preferences. Although only three user selection buttons are shown, an embodiment of the program notification element 400 could include more or less than three. The currently selected user selection button 404 may be highlighted or otherwise displayed in a visually distinguishable manner, as shown in FIG. 4. In practice, customized text could be rendered with the user selection buttons 404, 406, 408 to assign names to the buttons.

The settings button 410 can be activated to display a configuration, preferences, or settings page or window that accommodates certain user-entered options. For example, the settings page can be used to assign specific names to each user selection button 404, 406, 408, to designate how long the program notification element 400 remains displayed, to designate when the program notification element 400 will be displayed relative to the start time of an upcoming program event, etc. Notably, the settings page also allows the user to enter his or her program content preferences, search criteria, likes, dislikes, etc. In this regard, the settings page may include any number of data entry fields, dropdown menus, radio buttons, checkboxes, and/or other elements to accommodate user-specified information.

The close button 412 can be activated to manually exit or disable the program notification element 400. Thus, the close button 412 allows the user to quickly and easily close the program notification element 400 to return to the current program event and to minimize the distraction caused by the display of the program notification element 400. Although not depicted in FIG. 4, the program notification element 400 may be rendered such that it can be resized, moved, expanded, and/or minimized by the user as desired.

The program listing 402 includes one or more entries for program events that have been identified as being of interest to the currently selected user. For this example, the program listing 402 includes only three upcoming program events, however, any number of program events could be listed. Moreover, the program listing 402 may be rendered as a scrollable list or as a multipage list to accommodate additional entries if needed. The specific information included with a given entry may vary from one embodiment to another. The illustrated embodiment contains at least the following items for each program event entry: a channel identifier 420; a start time indicator 422; an event title 424; and a genre identifier 426. These fields will include appropriate text, icons, logos, and/or any suitable indication of the corresponding information, as is well understood.

The program notification element 400 may also be rendered with interactive user controls to accommodate user-initiated commands and instructions. For this example, each entry in the program listing 402 may include, without limitation: a "Go" command element 428; a "Record" command element 430; and an "Auto Start" command element 432. The "Go" command element 428 may be implemented as an active GUI control or link that, when selected by the user, causes the video services receiver to immediately tune to the channel associated with the upcoming program event. For example, if the user activates the "Go" command element 428 for the "Pulp Fiction" entry (as depicted in FIG. 4), the video services receiver will change to Channel 114, terminate the current program event, and close the program notification element 400. This action allows the user to immediately change channels in anticipation of an upcoming event, such as "Pulp Fiction" in this example.

The "Record" command element 430 may be implemented as a selectable radio button or checkbox that, when selected by the user, schedules a recording of the selected program event. FIG. 4 depicts a scenario where the user has chosen to record "NBA Basketball" and "SpongeBob Squarepants" by selecting the corresponding "Record" command elements 430. The actual recording function may be performed by the recording module 212 (see FIG. 2) in accordance with conventional recording techniques. The "Auto Start" command element 432 may be implemented as a selectable radio button or checkbox that, when selected by the user, causes the video services receiver to automatically tune to the selected program event at or near the start time of that event. For example, if the user activates the "Auto Start" command element 432 for the "NBA Basketball" entry (as depicted in FIG. 4), the video services receiver will automatically switch to Channel 8 (or remain on Channel 8 if already tuned to Channel 8) at or near the scheduled start time of 10:00. This action allows the user to continue watching the current program event while ensuring that the desired upcoming program event will not be missed or forgotten.

Figure 5:
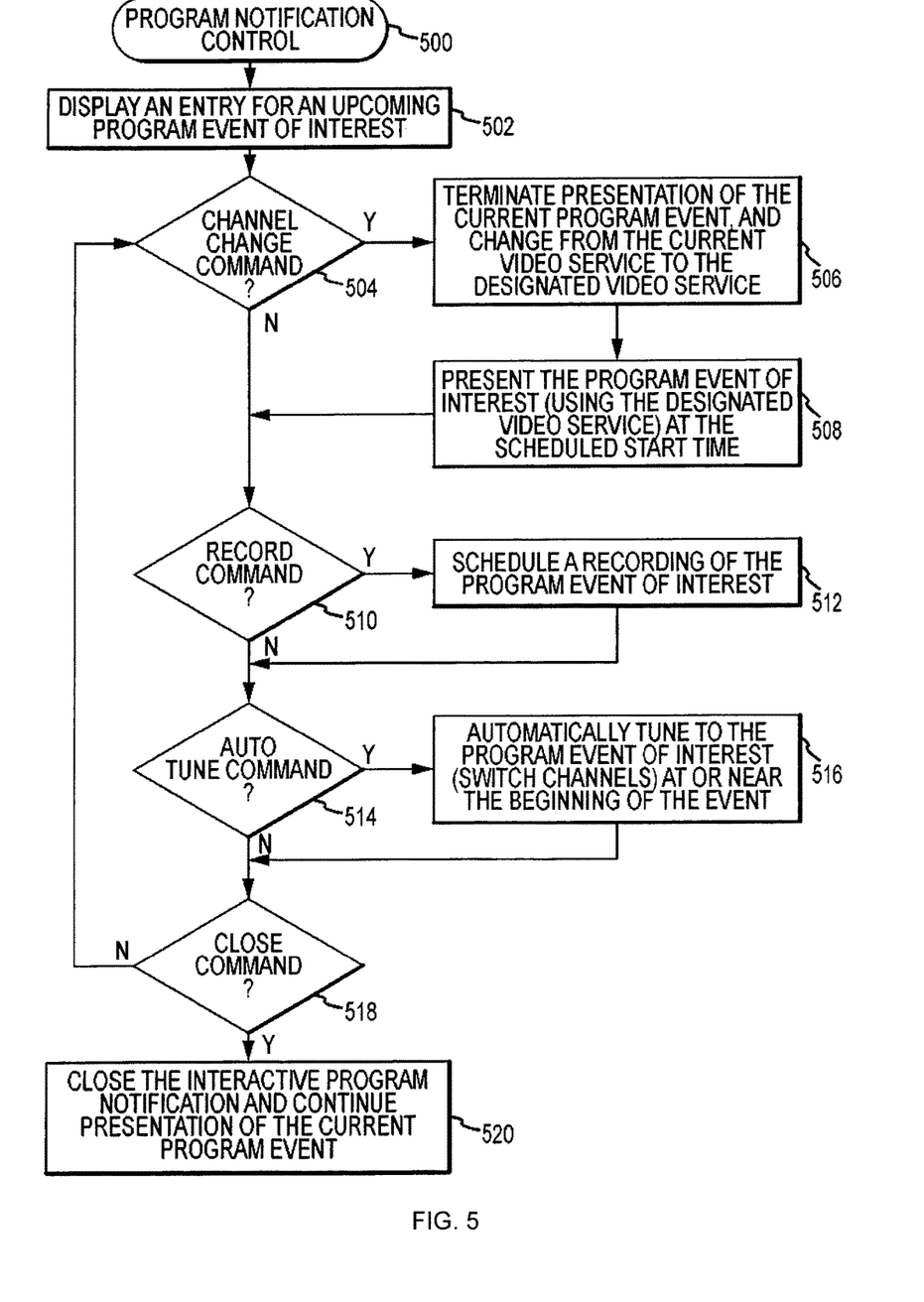
FIG. 5 is a flow chart that illustrates an exemplary embodiment of a method of controlling a video services receiver using a program notification element.

FIG. 5 is a flow chart that illustrates an exemplary embodiment of a process 500 of controlling a video services receiver using a program notification element. The illustrated embodiment of the process 500 assumes that the program notification element includes at least the various features and control elements described above in connection with FIG. 4. Thus, the process 500 is performed in connection with the rendering of a graphical program notification that is provided as an interactive element to accommodate user interaction, as described above. Accordingly, the process 500 displays an entry for an upcoming program event of interest (task 502), which is scheduled for delivery by a designated video service or channel.

If the video services receiver obtains or receives a user-initiated channel change command, the process 500 proceeds to change channels (the "Yes" branch of query task 504). In practice, a user-initiated channel change command may be received in response to user interaction with the program notification element, such as activation of the "Go" command element 428 shown in FIG. 4. In response to the channel change command, the video services receiver changes from the current video service (that is currently providing one video program event) to the video service that will provide the upcoming program event (task 506). In connection with task 506, therefore, the current program event is terminated to accommodate the presentation of the content provided by a different video service. Assuming that the video services receiver remains tuned to the new video service, the upcoming program event of interest will be presented to the user at its scheduled start time (task 508). Of course, channel changing is unnecessary if the current program event is being provided on the same video service that will provide the upcoming program event in the future.

If the video services receiver obtains or receives a user-initiated record command (the "Yes" branch of query task 510), the process 500 continues by scheduling a recording of the upcoming program event of interest (task 512). In practice, a user-initiated record command may be received in response to user interaction with the program notification element, such as activation of the "Record" command element 430 shown in FIG. 4. In response to the record command, the video services receiver records the designated program event at the appropriate start time, using conventional recording techniques and technology.

If the video services receiver obtains or receives a user-initiated automatic tune command (the "Yes" branch of query task 514), the process 500 continues by automatically tuning to the upcoming program event of interest at or near the beginning or start time of that event (task 516). In practice, a user-initiated automatic tune command may be received in response to user interaction with the program notification element, such as activation of the "Auto Start" command element 434 shown in FIG. 4. At the appropriate time, therefore, the video services receiver automatically changes channels (if needed) to accommodate presentation of the particular program event.

If the video services receiver obtains or receives a close command or instruction (the "Yes" branch of query task 518), the process 500 continues by closing the interactive program notification element such that presentation of the current program event can continue without further interruption (task 520). A close command may be a user-initiated command received in response to user interaction with the program notification element, such as activation of the close button 412 shown in FIG. 4. Alternatively, a close command may be issued as an internal instruction after a designated amount of time to automatically close the program notification element without any user involvement.

Figure 6:
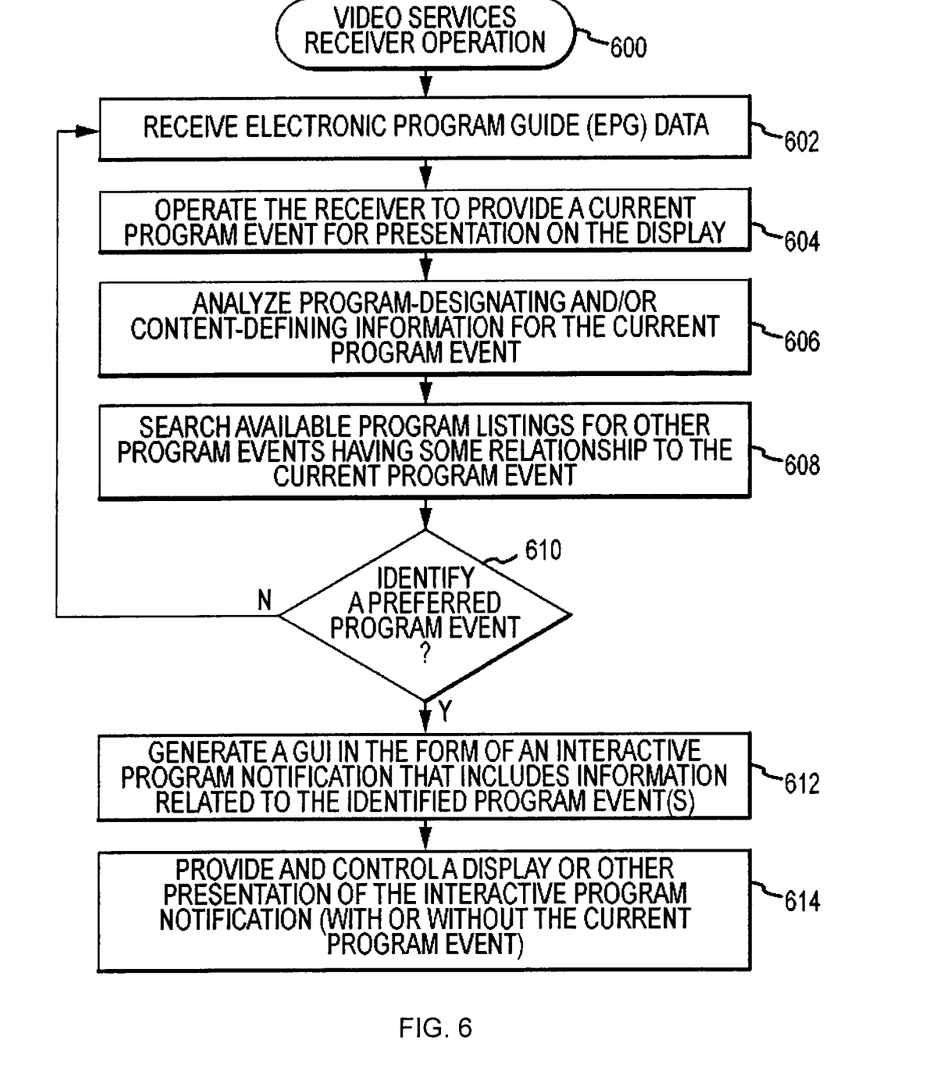
FIG. 6 is a flow chart that illustrates another exemplary embodiment of a method of operating a video services receiver.

The process 300 described above relates to one exemplary embodiment that utilizes user-specified preferences and search criteria to find upcoming program events having content or contextual meaning suitable for the user. Alternatively (or additionally), the video services receiver could be configured to find upcoming program events that are similar in content or context to a current program event being viewed by the user, to recent program events viewed by the user, or the like. In this regard, FIG. 6 is a flow chart that illustrates another exemplary embodiment of a process 600 of operating a video services receiver. The process 600 includes some tasks and features that are similar or identical to counterpart tasks and features described above with reference to the process 300, and common aspects will not be redundantly described here for the process 600.

The process 600 receives and processes EPG programming data (task 602) and operates the video services receiver (task 604) to provide a current program event for presentation on the display, as described above for the process 300. In contrast to the process 300, which searches for content that matches user-specified criteria, the process 600 obtains and analyzes program-designating and/or content-defining information for the current program event (task 606). In practice, the video services receiver can scan the EPG data associated with the current program event to determine the particular metadata that is relevant for purposes of searching for similar content available on other channels and/or available in the future. Thus, the process 600 searches the available program listings for other program events having some contextual relationship (e.g., similar content) to the current program event (task 608). For example, the process 600 might search the available program listings for upcoming program events having a designated genre, a designated title, and/or a designated series title that matches the genre, title, and series title of the current program event. Alternatively or additionally, the process 600 could search the available program listings using any of the data types, fields, and metadata listed above in connection with the description of the database 224 and/or the EPG module 218 (see FIG. 2).

If the process 600 does not identify any upcoming program event having characterizing metadata that matches or is otherwise consistent with the program-designating information for the current program event (the "No" branch of query task 610), then the process 600 may exit or return to task 602 to proceed as described above. This example assumes that the process 600 identifies at least one upcoming program event having content or subject matter that is deemed to be consistent with the content or subject matter of the current program event (the "Yes" branch of query task 610). Consequently, the process 600 continues by generating (task 612) and presenting (task 614) an interactive GUI in the form of a program notification element, in the manner described above for the process 300.

Figure 7:
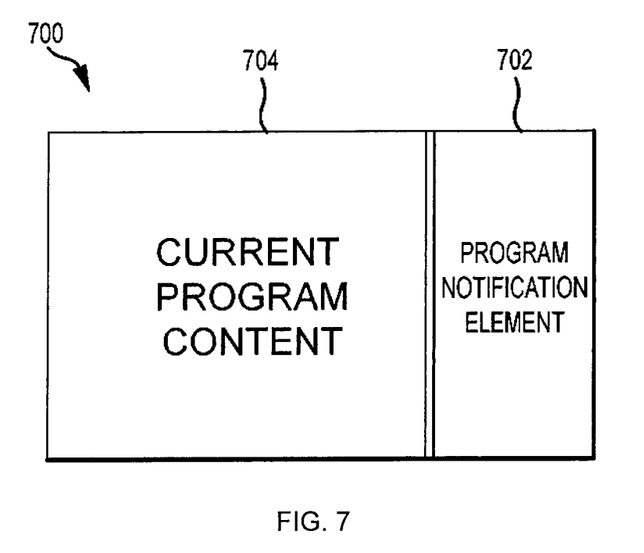
FIGS. 7-10 are diagrams that show several exemplary screen layouts for a program notification element.
Figure 8:
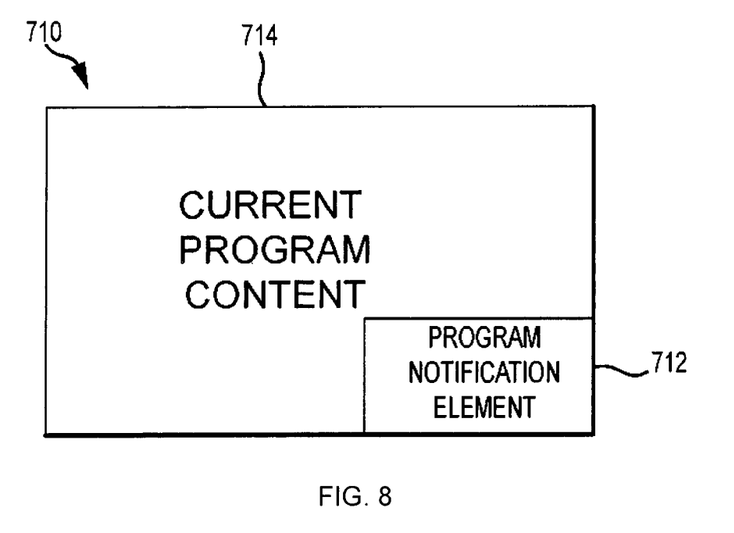
Figure 9:
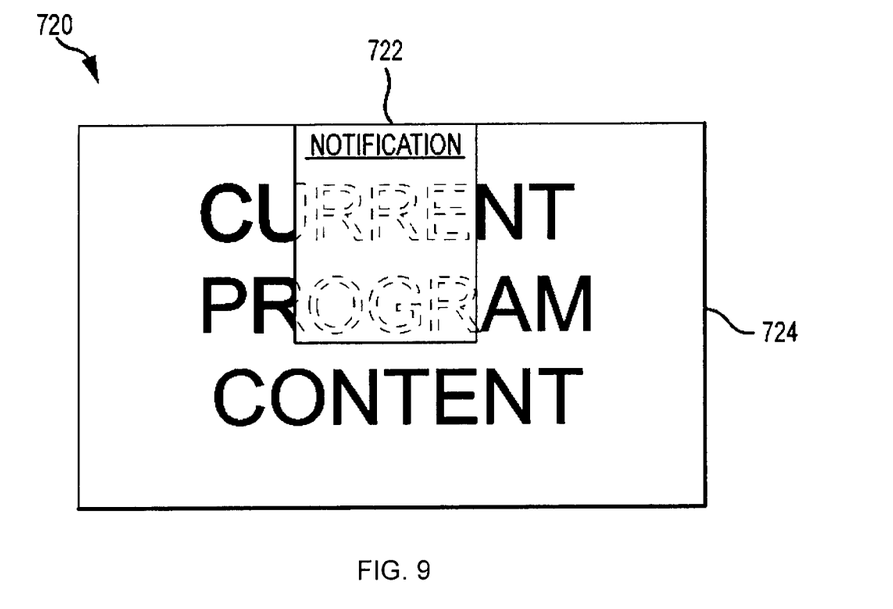
Figure 10:
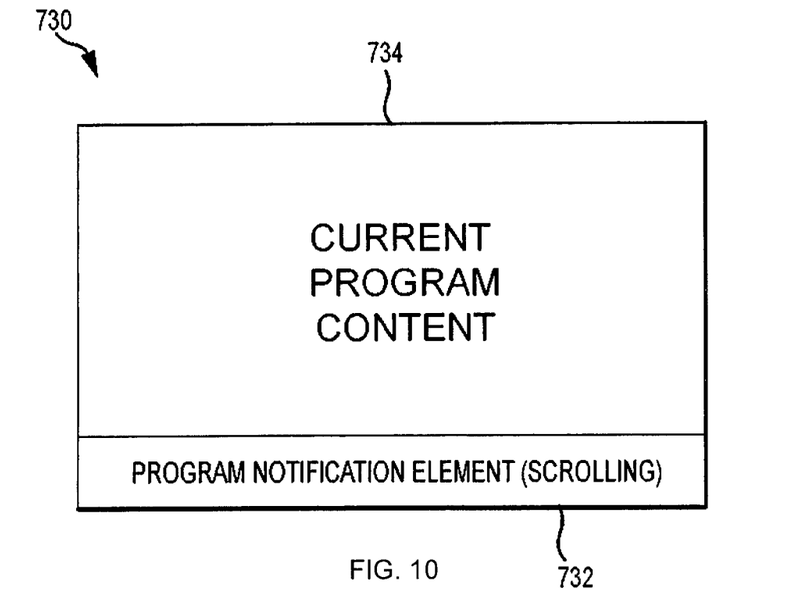

It should be appreciated that FIG. 4 depicts only one possible layout that is suitable for a program notification element. Moreover, for ease of description and illustration, FIG. 4 shows the program notification element 400 by itself. In practice, however, a program notification element can be rendered concurrently with the current program event. In this regard, FIGS. 7-10 are diagrams that show several exemplary screen layouts for a program notification element. FIG. 7 depicts a split-screen implementation of a display 700 that includes a program notification element 702 in one portion of the display 700, and the current program content 704 displayed in another portion of the display 700, with no overlap between the two portions. FIG. 8 depicts a picture-in-picture implementation of a display 710 that includes a program notification element 712 in a picture-in-picture window of the display 710, and the current program content 714 displayed in the primary window of the display 710, with some overlap between the two windows. FIG. 9 depicts a "translucent" overlapping implementation of a display 720 that includes a see-through program notification element 722 that is superimposed over the current program content 724. The program notification element 722 is rendered using transparency or translucency effects such that at least some of the underlying current program content 724 remains visible through the program notification element 722. FIG. 10 depicts a scrolling or ticker tape implementation of a display 730 that includes a program notification element 732 positioned in an unobtrusive location of the display 730. The remainder of the display 730 is devoted to the current program content 734. This particular implementation could be utilized to display the program notification element 732 in a persistent manner that is automatically updated whenever the video services receiver identifies new upcoming program events of interest. In practice, the content of the program notification element 732 can be scrolled across the display 730 as needed such that the user can casually view the upcoming program events when needed, without diverting attention away from the current program content 734.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a video services receiver, the method comprising:
configuring the video services receiver for identifying an upcoming program event having similarity in at least one of a context relationship or a content of a recent program event wherein data of the upcoming program event is delivered to the video services receiver prior to a scheduled broadcast;
automatically identifying, at the video services receiver by the configuring of the video services receiver, in a first instance, an upcoming program event scheduled for delivery by a designated video service with similarity in the context relationship to the recent program event, and in a second instance, based only on previously saved content matching criteria and without further user action, an upcoming program event having content preferred by a user of the video services receiver, wherein the previously saved content matching criteria does not explicitly identify the upcoming program event, the automatically identifying further comprising:
searching available program listing for other program events having a contextual relationship to the current program event by:
obtaining and analyzing program-designating and content-defining information for a current program event that matches a user specified criteria wherein the content-defining information comprises: entered data in a formatted database of recorded programs at the video services receiver wherein the searching of the available program listing is performed using types, fields and metadata listed in connection with descriptions of the recorded programs in the formatted database wherein identifying the upcoming program event comprises searching with a plurality of search terms, with the video services receiver, available program listings for upcoming program events having a designated genre that matches a genre of the current program event;
providing a current program event for presentation on a display associated with the video services receiver;
generating, at the video services receiver, a graphical program notification comprising information related to the upcoming program event, the graphical program notification further comprising an auto start command element that accommodates user interaction;
providing the graphical program notification for presentation on the display concurrently with the current program event wherein the graphical program notification further comprises: a channel change command element that accommodates user interaction operating the video services receiver to tune to the designated video service in response to user interaction with the channel change command element and a record command element that accommodates user interaction operating the video services receiver to record the upcoming program event in response to user interaction with the record command element;
receiving a user-initiated command in response to user interaction with the auto start command element; and
after receiving the user-initiated command, operating the video services receiver to automatically tune to the designated video service at the beginning of the upcoming program event.

2. A video services receiver for presenting video content, the video services receiver comprising:
a receiver interface to receive data associated with video services;
a display interface for a display operatively coupled to the video services receiver, the display interface facilitating presentation of program events on the display;
a content identification module coupled to the receiver interface to analyze programming data associated with program events and the video services; and
a processor coupled to the receiver interface, the content identification module, and the display interface, wherein:
the processor generates an interactive program notification when the content identification module identifies in a first mode, an upcoming program event scheduled for delivery by a designated video service with similarity in a context, and in a second mode, an upcoming program event having content preferred by a user of the video services receiver, wherein the upcoming program event is scheduled for delivery by the designated video service, the content identification module automatically identifies the upcoming program event based only on previously saved content matching criteria and without further user action, and the previously saved content matching criteria does not explicitly identify the upcoming program event, the content identification module is configured to identify upcoming program events by:
searching available program listing for other program events having a contextual relationship to the current program event with a plurality of search terms by:
obtaining and analyzing program-designating and content-defining information for a current program event that matches a user specified criteria wherein the content-defining information comprises: entered data in a formatted database of recorded programs at the video services receiver wherein the searching of the available program listing is performed using types, fields and metadata listed in connection with descriptions of the recorded programs in the formatted database wherein the content identification module is configured to identify upcoming program events having designated content that is consistent using the plurality of search terms with content of a current program event that is currently being presented and with user-specified content preferences for the user;

the interactive program notification comprises information related to the upcoming program event, and further comprises an auto start command element that accommodates user interaction;

the display interface presents the interactive program notification window for rendering on the display;

the processor receives a user-initiated command in response to user interaction with the auto start command element; and after receiving the user-initiated command, the processor operates the video services receiver to automatically tune to the designated video service at the beginning of the upcoming program event or alternatively, in response to user entering a predefined sequence of characters or a predefined sequence of button entries presentation of a channel-specific recorded content is initiated.

* * * * *